(12) United States Patent
Ishihara

(10) Patent No.: US 7,782,086 B2
(45) Date of Patent: Aug. 24, 2010

(54) SEMICONDUCTOR INTEGRATED CIRCUIT DEVICE

(75) Inventor: Masayuki Ishihara, Hachiouji (JP)

(73) Assignee: Oki Semiconductor Co., Ltd. (JP)

( * ) Notice: Subject to any disclaimer, the term of this patent is extended or adjusted under 35 U.S.C. 154(b) by 0 days.

(21) Appl. No.: 12/354,868

(22) Filed: Jan. 16, 2009

(65) Prior Publication Data

US 2009/0184759 A1    Jul. 23, 2009

(30) Foreign Application Priority Data

Jan. 22, 2008    (JP) .............................. 2008-011632

(51) Int. Cl.
*H03K 19/173*    (2006.01)
(52) U.S. Cl. .......................................... 326/38; 326/82
(58) Field of Classification Search ............. 326/37–41, 326/82, 83, 100
See application file for complete search history.

(56) References Cited

U.S. PATENT DOCUMENTS 5,477,067 A * 12/1995 Isomura et al. ............. 257/211

FOREIGN PATENT DOCUMENTS

| JP | 7037987 A | 2/1995 |
| JP | 2000003963 A | 1/2000 |

* cited by examiner

*Primary Examiner*—Don P Le
(74) *Attorney, Agent, or Firm*—Studebaker & Brackett PC; Donald R. Studebaker (57) ABSTRACT

The present invention provides a semiconductor integrated circuit device that reduces the influence of crosstalk noise and is operable properly even when relatively long signal wirings that pass over a macrocell are formed. In the semiconductor integrated circuit according to the present invention, buffering cells formed between the macrocell and an input/output circuit close thereto are connected to their corresponding signal wirings extended so as to pass over an area formed with the macrocell.

7 Claims, 9 Drawing Sheets

| CIRCUIT SYMBOL | CONNECTION SOURCE | CONNECTION DESTINATION |
|---|---|---|
| ⋮ | ⋮ | ⋮ |
| L51 | io50 | sc56 |
| L61 | io60 | sc66 |
| L71 | io70 | sc76 |
| ⋮ | ⋮ | ⋮ |

FIG. 8

| CIRCUIT SYMBOL | CONNECTION SOURCE | CONNECTION DESTINATION |
|---|---|---|
| ⋮ | ⋮ | ⋮ |
| L51 | io50 | bc54i |
| BC54 | bc54i | bc54o |
| L52 | bc54o | bc55i |
| BC55 | bc55i | bc55o |
| L53 | bc55o | sc56 |
| L61 | io60 | sc66 |
| L71 | io70 | sc76 |
| ⋮ | ⋮ | ⋮ |

SEMICONDUCTOR INTEGRATED CIRCUIT DEVICE

BACKGROUND OF THE INVENTION

The present invention relates to a semiconductor integrated circuit device including an input/output circuit and a macrocell.

With miniaturization of a semiconductor process, a problem associated with crosstalk noise has been increased in recent years. The crosstalk noise is generally known as noise produced in the other of two signal wirings via a coupling capacitance between the signal wirings when a signal level changes at one of the signal wirings where the two signal wirings are wired close to each other. A problem arises in that when the crosstalk noise occurs, operating timing gets out of order due to the fact that, for example, a transmission delay occurs in a signal transmitted through a wiring on the side subjected to the crosstalk noise, so that a semiconductor integrated circuit device is not operated properly. Contrivance has heretofore been made to a signal wiring method to avoid these problems.

A semiconductor integrated circuit device, which decides a path for a field through wiring passing through upper hierarchy of a macrocell such as a RAM by automatic selecting wiring according to a predetermined wiring algorithm, has been disclosed in, for example, a patent document 1 (Japanese Unexamined Patent Publication No. Hei 7 (1995)-37987). According to the semiconductor integrated circuit device, since the path for the field through wiring can be set freely unlike a case in which a pre-set fixed field through wiring is used, the type development of the macrocell can be facilitated.

A semiconductor integrated circuit wherein each signal line is laid with being superimposed on an area extending from one end on a circuit area, of a memory to the other end thereof, i.e., a specific area less subject to an influence due to the signal line, has been disclosed in a patent document 2 (Japanese Unexamined Patent Publication No. 2000-3963). According to the semiconductor integrated circuit, a signal is wired to an area for a decoder or the like less subject to the influence of crosstalk noise due to each signal wiring, thereby making it possible to realize a normal memory operation and improve layout efficiency.

Figure 11:
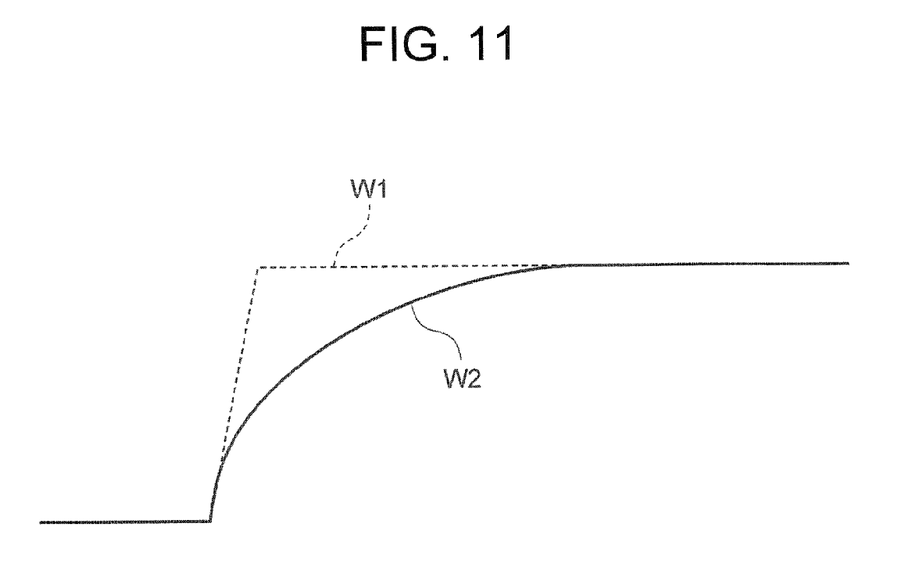
FIG. 11 is a diagram showing an original waveform and a round waveform.

Meanwhile, change points of a signal level, i.e., the rising and falling spots of a signal waveform are most susceptible to the crosstalk noise. Since it takes time to charge and discharge a signal wiring capacitance with changes in signal level, the rising and falling edges of the waveform become gentle. Namely, it is known that the waveform is rounded. FIG. 11 is a diagram showing an original waveform W1 and a round waveform W2 where a signal level changes from a low level to a high level. The original waveform W1 indicated by a dotted line in the same figure rises approximately vertically, whereas the rising edge of the round waveform W2 indicated by a solid line is gentle.

Figure 12:
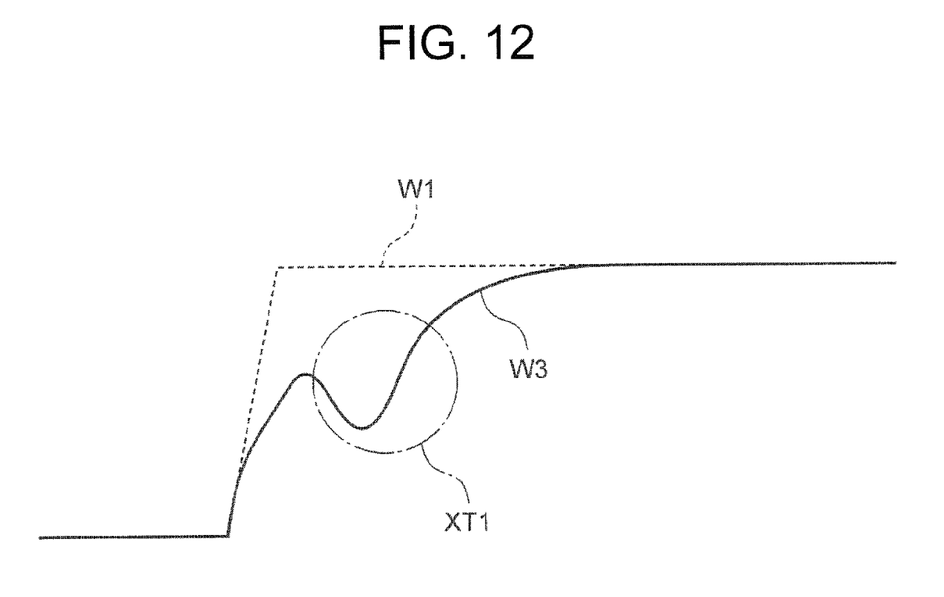
FIG. 12 is a diagram illustrating an original waveform and a round waveform with crosstalk noise superimposed thereon.

The rising and falling spots of the waveform are placed in a state in which the signal level is transitioned from a high level to a low level and vice versa. A transmission delay due to the influence of the crosstalk noise becomes large at both spots. When, for example, signal levels change at signal wirings adjacent to each other simultaneously, crosstalk noise is superimposed on the rising and falling spots of the waveform. FIG. 12 is a diagram showing an original waveform W1 and a round waveform W3 on which crosstalk noise is superimposed. The round waveform W3 indicated by a solid line in the same figure is disturbed in rising spot due to the overlap of the crosstalk noise (spot XT1 surrounded by a circle in the same figure). Thus, a problem arises in that a delay occurs in a transmission signal and a semiconductor integrated circuit device is not operated properly.

A signal wiring that passes over a relatively large macrocell such as a memory has a tendency that it becomes longer than other wirings. Since the signal wiring becomes long, the capacitance thereof increases normally, the rounding of a waveform also becomes large. Therefore, the relatively long signal wiring that passes over the macrocell is susceptible particularly to crosstalk noise.

Since the number of wiring layers for wiring signal wirings that pass over a macrocell is generally small, long-distance parallel wiring based on the minimum wiring pitch is normally performed where automatic wiring by an automatic wiring tool is done. In this case, an error due to crosstalk noise becomes easy to occur. Since these signal wirings are wired in parallel over a long distance at narrow intervals although an error correction subsequent to the automatic wiring is normally made manually, the correction is difficult and a long period of time is spent on correction work. When the error cannot be resolved by the wiring correction based the manual work, the layout must have been changed considerably retroactively to a layout initial step.

In the semiconductor integrated circuit device disclosed in the patent document 1, the occurrence of the transmission delay cannot be avoided where the crosstalk noise is superimposed on the rising and falling spots of the waveform, although the path for the field through wiring can be set freely. Particularly when the crosstalk noise occurs in the relatively long signal wiring that passes over the macrocell, the semiconductor integrated circuit device could not be operated properly. In the semiconductor integrated circuit disclosed in the patent document 2, the amount of crosstalk noise produced in the signal wiring per se cannot be reduced although the proper memory operation can be realized by forming the signal wiring in the area hard to be susceptible to the crosstalk noise on the circuit area of the memory. When the crosstalk noise has occurred in the relatively long signal wiring that passes over the macrocell, the whole semiconductor integrated circuit could not be operated properly.

The wiring method based on the automatic selecting wiring, which has been disclosed in the patent document 1, was accompanied by problems that the error due to the crosstalk noise was easy to occur, and waste of work and time for manual error correction work and a significant layout change retroactive to a layout initial step would occur.

SUMMARY OF THE INVENTION

The present invention has been made in view of the foregoing problems. It is therefore an object of the present invention to provide a semiconductor integrated circuit device that reduces the influence of crosstalk noise and is operable properly even when relatively long signal wirings that pass over a macrocell are formed.

According to one aspect of the present invention, for attaining the above object, there is provided a semiconductor integrated circuit device including an input/output circuit, comprising a macrocell formed close to the input/output circuit, a buffering cell formed between the input/output circuit and the macrocell, an input-side signal wiring having one end connected to the input/output circuit and the other end connected to an input of the buffering cell, and an output-side signal wiring having one end connected to an output of the buffering cell and extended so as to pass over an area in which the macrocell is formed.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

A preferred embodiment of the present invention will hereinafter be described with reference to the accompanying drawings.

Figure 1:
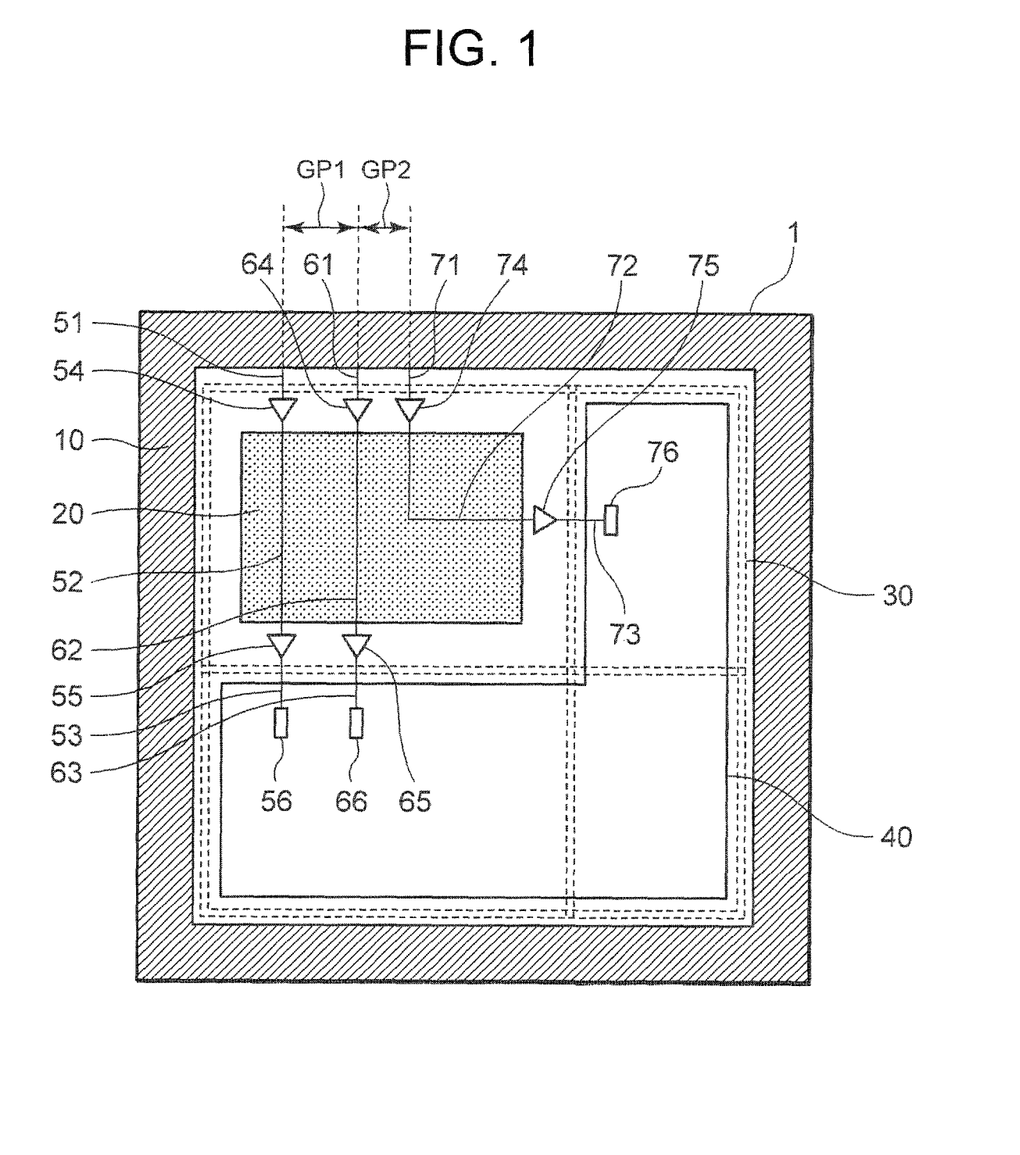
FIG. 1 is a plan view showing a semiconductor integrated circuit device according to the present invention.

FIG. 1 is a plan view showing a semiconductor integrated circuit device 1 according to the present invention. The semiconductor integrated circuit device 1 is of, for example, a so-called semiconductor chip such as an LSI formed over a silicon substrate or the like by the normal semiconductor integrated circuit manufacturing technology. An input/output circuit 10 is formed at a peripheral edge portion of the semiconductor integrated circuit device 1. The input/output circuit 10 is of a so-called 10 (Input/Output) circuit which performs the input/output of a transmission signal to and from an unillustrated circuit provided outside the semiconductor integrated circuit device 1. A macrocell 20 is formed in the vicinity of the input/output circuit 10. The macrocell 20 is of, for example, a RAM (Random Access Memory), a ROM (Read Only Memory), a CPU (Central Processing Unit), a PLA (Programmable Logic Array) or the like. The macrocell 20 is of a functional block whose function has been determined in advance. Source potential and ground potential wirings 30 are wired in every direction and supply power to various circuits and cells lying on the semiconductor integrated circuit device 1. Standard cells 56, 66 and 76 and the like can be arbitrarily disposed within a standard cell layout area 40 according to purposes.

A buffering cell 54 is formed between the input/output circuit 10 and the macrocell 20. The buffering cell 54 has the function of outputting a transmission signal received by its own input part from its own output part. One end of a signal wiring 51 is connected to the input/output circuit 10 and the other end thereof is connected to the input part of the buffering cell 54. One end of the signal wiring 52 is connected to the output part of the buffering cell 54 and extends to a layer different from a layer with the macrocell 20 formed therein so as to pass over the macrocell 20. The other end of the signal wiring 52 is connected to the input of a buffering cell 55. One end of a signal wiring 53 is connected to the output of the buffering cell 55 and the other end thereof is connected to the standard cell 56.

The input/output circuit 10 supplies the transmission signal received from outside to the buffering cell 54 via the signal wiring 51. The buffering cell 54 transmits the transmission signal to the signal wiring 52 and supplies the same to the buffering cell 55. The buffering cell 55 transmits the transmission signal to the signal wiring 53 and supplies the same to the standard cell 56. A transmission path comprising signal wirings 61, 62 and 63, buffering cells 64 and 65 and the standard cell 66, and a transmission path comprising signal wirings 71 and 72, buffering cells 74 and 75 and a standard cell 76 also take similar connection configurations and perform similar signal transmission, respectively. The signal wirings that pass over the macrocell 20 may be formed so as to pass over the macrocell 20 in a straight line like the signal wiring 52. Alternatively, the signal wirings may be formed so as to pass over the macrocell 20 while the direction of the signal wiring 72 is being changed over the macrocell 20 like the signal wiring 72.

Figure 2:
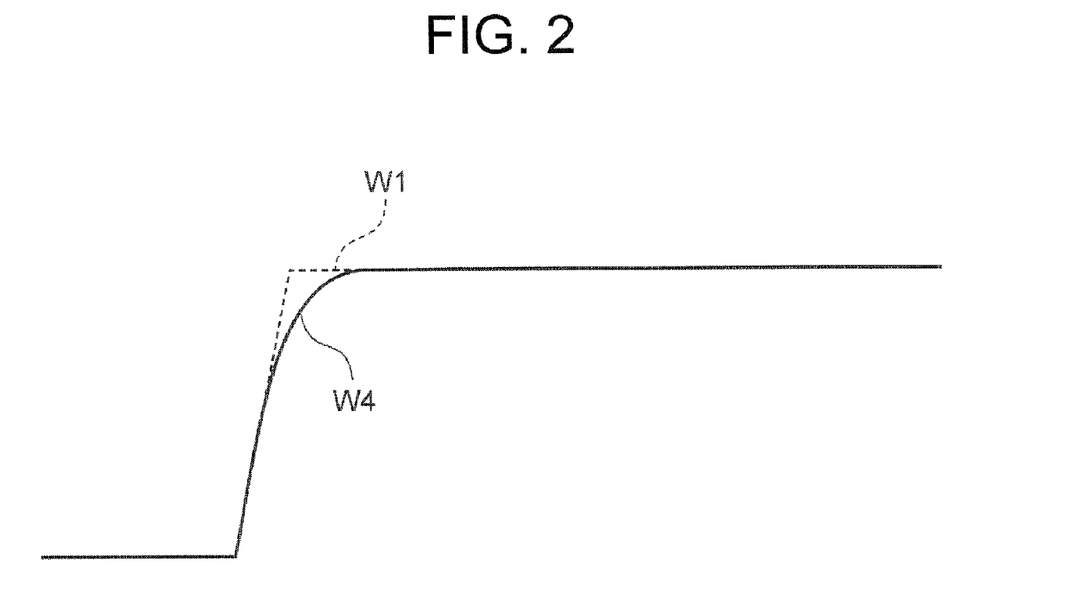
FIG. 2 is a diagram illustrating an original waveform and a round waveform.

The buffering cell 54 buffers the transmission signal sent from the input/output circuit 10 and transmits it to the signal wiring 52, thereby reducing waveform rounding of the transmission signal at the signal wiring 52. FIG. 2 is a diagram showing an original waveform W1 and a round waveform W4 at the signal wiring 52 when a signal level changes from a low level to a high level. A point where the round waveform 4 indicated by a dotted line in the same figure rises, takes a steep waveform in a manner substantially similar to a point where the original waveform W1 indicated by a solid line rises. This point is small in waveform rounding. The buffering intensity of the buffering cell 54 is adjusted to the optimum intensity according to, for example, the wiring impedance, wiring length and wiring width of the signal wiring 52, the input capacitance of the buffering cell 55 on the reception side, the presence or absence of a terminating resistor, etc. Incidentally, if the buffering cell 54 is not formed between the input/output circuit 10 and the macrocell 20 and the transmission signal is directly transmitted from the input/output circuit 10 to the signal wiring 52, then the rising edge results in a gentle round waveform W2 as shown in FIG. 11.

The signal wirings 52, 62 and 72 extend to the corresponding layer different from the layer formed with the macrocell 20 so as to pass over the macrocell 20. Their wiring lengths are normally longer than each signal wiring (not shown) wired within the standard cell wiring area 40. While it is known that as the signal wiring becomes long, the rounding of the waveform becomes large, the buffering cell 54 buffers the transmission signal sent from the input/output circuit 10 as in the present embodiment thereby to obtain a waveform steep in rising edge and small in rounding like the round waveform W4 shown in FIG. 2 even when the transmission signal is transmitted to the signal wiring 52 relatively long in wiring length.

Figure 3:
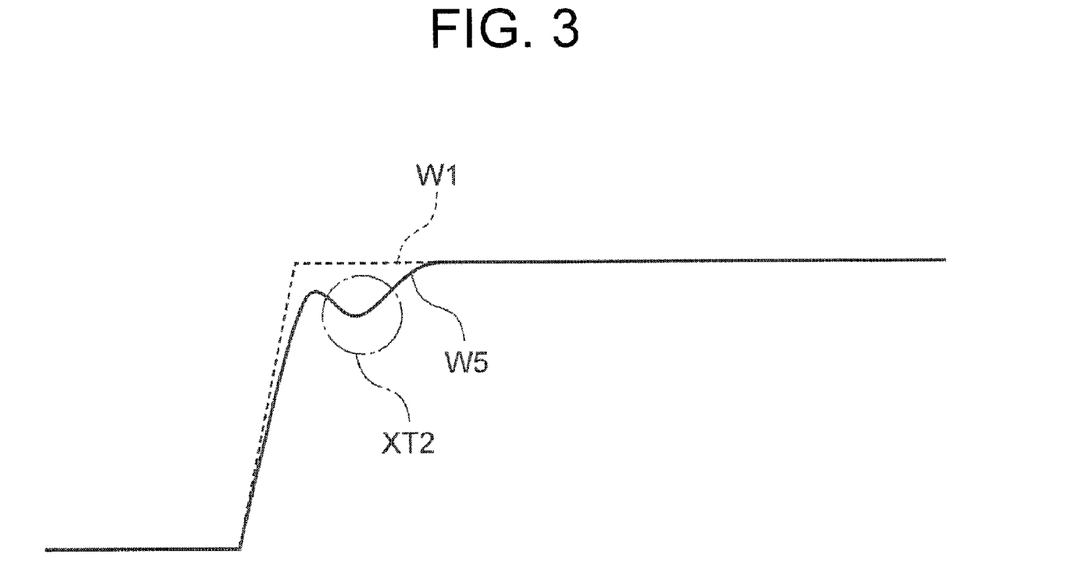
FIG. 3 is a diagram depicting an original waveform and a round waveform with crosstalk noise superimposed thereon.

FIG. 3 is a diagram showing an original waveform W1 at the signal wiring 53 and a round waveform W5 with crosstalk noise superimposed thereon where a signal level changes from a low level to a high level. The waveform of a transmission signal outputted from the buffering cell 54 is steep in rising edge as indicated by the round waveform W4 of FIG. 2 and is not much different from the original waveform W1. Therefore, even when crosstalk noise caused due to a change in signal level of the signal wiring 62 adjacent to the signal wiring 52 is superimposed on the transmission signal of the signal wiring 52, the round waveform W5 whose rising point is almost undisturbed as shown in FIG. 3 is reached. The signal level of a point or spot XT2 surrounded by a circle in the same figure is merely reduced slightly to the low level side. Incidentally, if the buffering cell 54 is not formed between the input/output circuit 10 and the macrocell 20 and the transmission signal is directly transmitted from the input/output circuit 10 to the signal wiring 52, then a round waveform W3 whose rising point or spot is disturbed as shown in FIG. 12 is reached.

Generally, as the distance between signal wirings adjacent to each other decreases, coupling capacitance increases and the amount of crosstalk noise also increases. Thus, increasing the distance between the signal wirings adjacent to each other is effective in reducing the amount of crosstalk noise. As shown in FIG. 1, the signal wiring 52 and the signal wiring 62 adjacent thereto are formed while a wiring interval or gap GP1 equal to twice or more the minimum wiring pitch is being held. Likewise, the buffering cells 54 and 64 are also formed while a wiring interval or gap GP1 equal to twice or more the minimum wiring pitch is being maintained. The minimum wiring pitch is defined by a semiconductor manufacturing process for manufacturing the semiconductor integrated circuit device 1. The signal wirings 62 and 72 and the buffering cells 64 and 74 are also respectively formed in like manner while the wiring gap GP2 equal to twice or more the minimum wiring pitch is being held. It is thus possible to further reduce the influence of mutually-given crosstalk noise.

In the semiconductor integrated circuit device according to the present invention as described above, the macrocell is formed adjacent to the input/output circuit and the buffering cells are further formed between the input/output circuit and the macrocell. The signal wiring formed so as to pass over the macrocell is connected to the output of each buffering cell. The buffering cell performs buffering of the transmission signal sent from the input/output circuit onto the corresponding signal wiring. Thus, since the rising edge and falling edge of the waveform of the transmission signal transmitted over the signal wiring become steep and hence waveform rounding is reduced, the waveform remains almost undisturbed even when the crosstalk noise caused due to the change in signal level of another signal wiring adjacent to the corresponding signal wiring overlap. Forming the buffering cell and signal wiring adjacent to each other while the wiring gap equal to twice or more the minimum wiring pitch defined by the semiconductor manufacturing process is being maintained enables a further reduction in the influence of mutually-given crosstalk noise. Therefore, a delay in the transmission signal due to the crosstalk noise does not occur and the semiconductor integrated circuit device can be operated normally.

Figure 4:
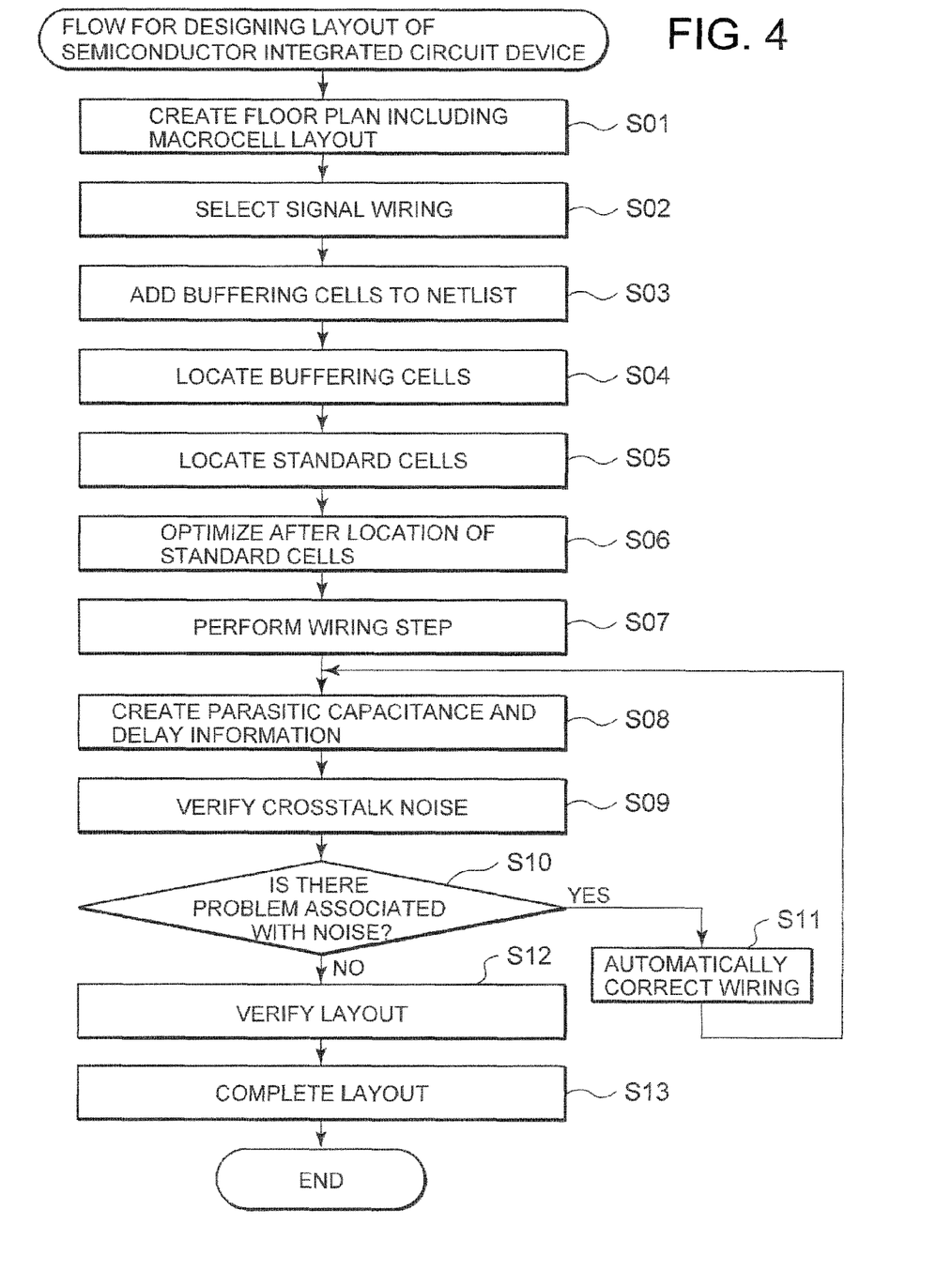
FIG. 4 is a flowchart showing a flow for designing a layout of the semiconductor integrated circuit device.

FIG. 4 is a flowchart showing a flow for designing a layout of a semiconductor integrated circuit device. A flow used for a method for designing a layout of the semiconductor integrated circuit device will be explained below with reference to FIG. 4.

Figure 5:
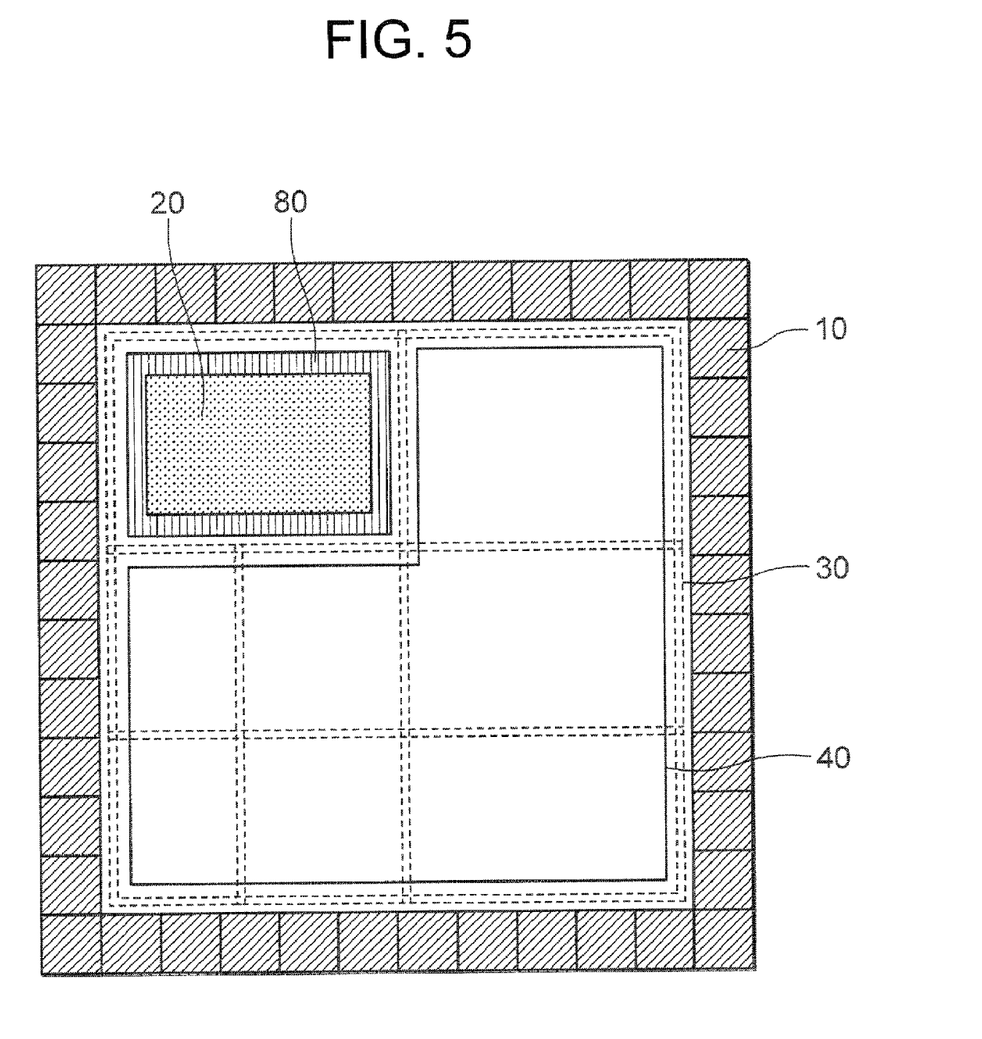
FIG. 5 is a plan view showing a floor plan.

First, a designer creates or makes up a floor plan of a semiconductor integrated circuit device 1 while taking into consideration information such as the types and sizes of various circuits for layout comparison (Step S01). FIG. 5 is a plan view showing a floor plan. In a floor plan creating process, the designer places an input/output circuit 10, a macrocell 20, source potential and ground potential wirings 30, a standard cell layout area 40 and a buffering cell layout area 80 in optimum positions as shown in FIG. 5 respectively while taking into consideration physical restrictions such as layouts, electrical restrictions such as power noise, etc. In particular, the designer places the macrocell 20 close to the input/output circuit 10 and places the buffering cell layout area 80 between the input/output circuit 10 and the macrocell 20 so as to adjoin the macrocell 20. The source potential and ground potential wirings 30 are disposed so as to surround the macrocell 20, standard cell layout area 40 and buffering cell layout area 80 and pass over the standard cell layout area 40 in every direction.

Figure 6:
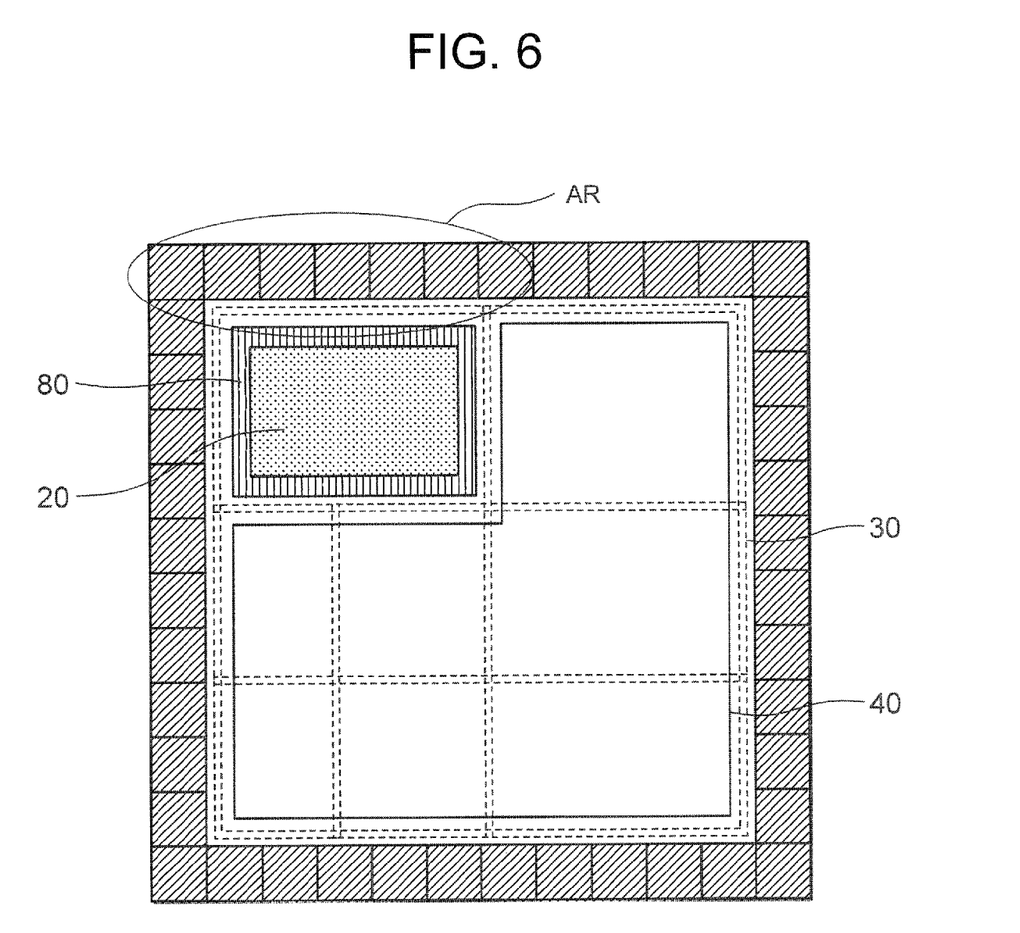
FIG. 6 is a plan view illustrating a floor plan along with a signal wiring selection area.

Next, the designer selects a signal wiring considered to be connected to the input/output circuit 10 and pass over the macrocell 20 in a wiring step in a post-process (S02). The designer selects a signal wiring considered to pass an area AR shown in FIG. 6, for example. In a wiring selection step, the designer selects, for every circuit, the corresponding signal wiring from within, for example, a netlist in which circuit symbols, connection destinations and connection sources or the like are associated with one another.

Figure 7:
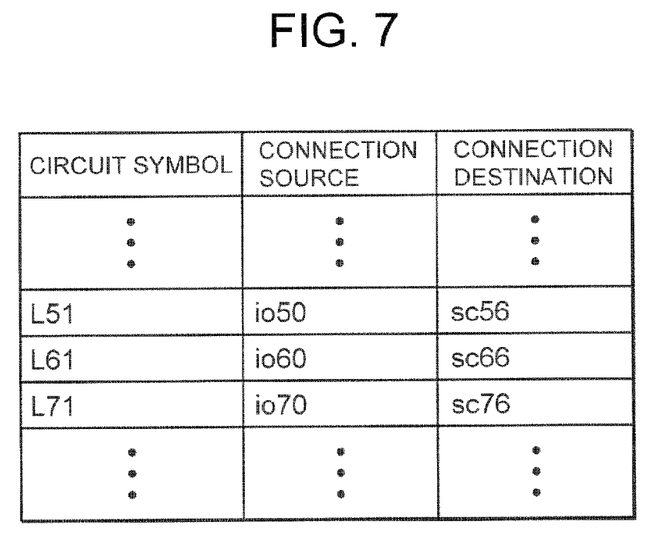
FIG. 7 is a diagram depicting one example of a netlist.

Subsequently, the designer adds two buffering cells to the signal wiring selected in the wiring selection step within the netlist (S03). FIG. 7 is a diagram showing one example of a netlist. A circuit symbol, a connection source and a connection destination are shown herein. The "circuit symbol" is of a symbol associated for every circuit. L51, L61 and L71 shown herein are of symbols respectively indicative of signal wirings 51, 61 and 71. The "connection source" and "connection destination" respectively indicate a connection source and a connection destination for every circuit. It is shown that for example, one end of the signal wiring 51 is connected to a terminal io50 of the input/output circuit 10, and the other end thereof is connected to a terminal sc56 of a standard cell.

Figure 8:
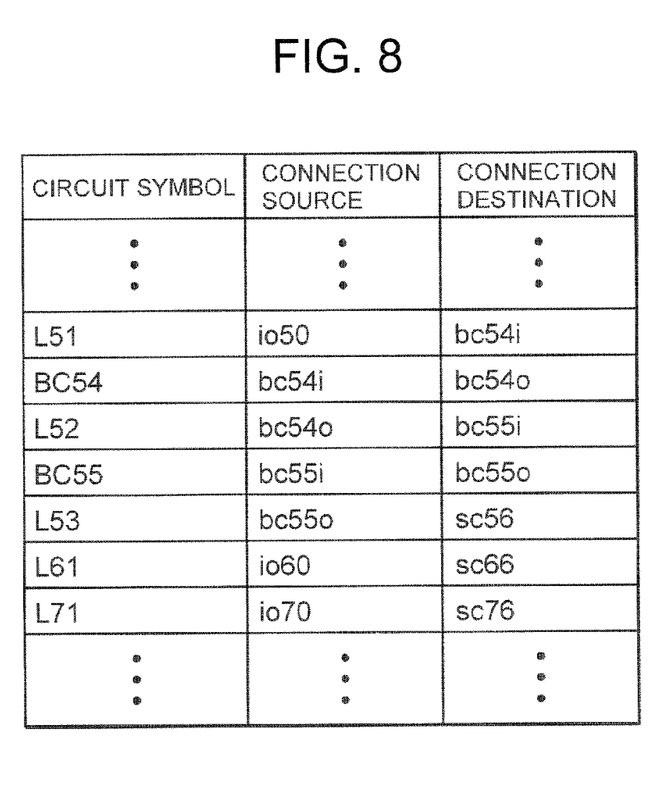
FIG. 8 is a diagram showing one example of a netlist subsequent to the addition of two buffering cells thereto.

Assume now that the designer selects the corresponding signal wiring 51 in the wiring selection step and adds two buffering cells to the signal wiring 51 within the netlist. FIG. 8 is a diagram showing one example of a netlist after two buffering cells have been added thereto. Circuit symbols BC54 and BC55 are of symbols indicative of buffering cells 54 and 55 respectively. One end of the signal wiring 51 is connected to its corresponding terminal io50 of the input/output circuit 10, and the other end thereof is connected to its corresponding input terminal bc54i of the buffering cell 54. An output terminal bc54o of the buffering cell 54 is connected to one end of a signal wiring 52, and the other end of the signal wiring 52 is connected to its corresponding input terminal bc55i of the buffering cell 55. An output terminal bc55o of the buffering cell 55 is connected to one end of a signal wiring 53, and the other end of the signal wiring 53 is connected to its corresponding terminal sc56 of a standard cell 56. Thus, the two buffering cells 54 and 55 are added to the signal wiring 51 that extends from the terminal io50 of the input/output circuit 10 to the terminal sc56 of the standard cell 56 within the netlist.

Figure 9:
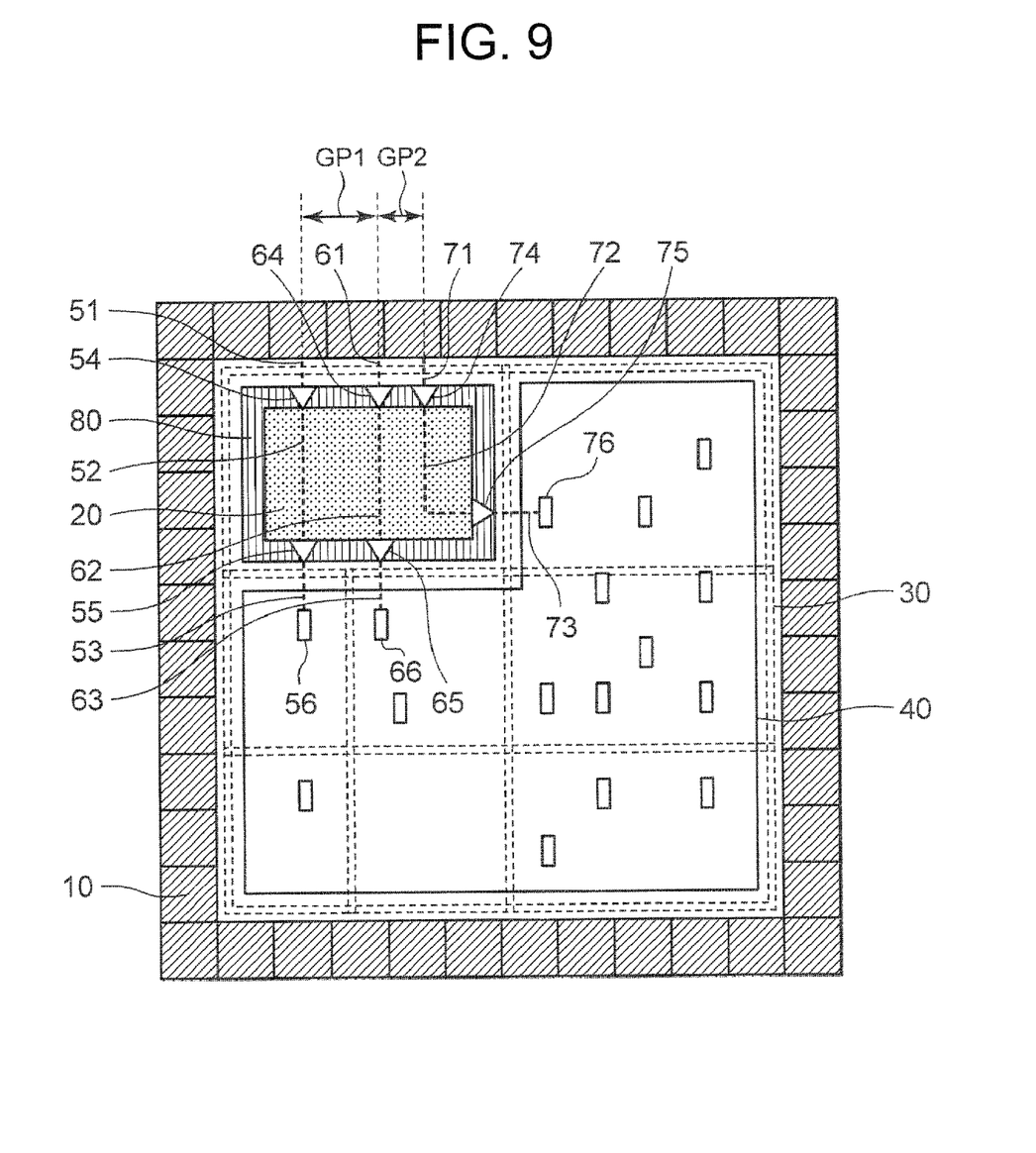
FIG. 9 is a plan view illustrating a layout in which temporary standard cells are disposed.

Next, the designer temporarily places a plurality of standard cells including standard cells 56, 66 and 76 within a standard cell layout area 40 as shown in FIG. 9. The positions of the temporarily-disposed standard cells can be optionally set by the designer. The designer sets wiring paths or routes for signal wirings 51 through 53, 61 through 63 and 71 through 73 indicated by dotted lines in FIG. 9, based on the coordinates of the positions of the temporarily-disposed standard cells and the coordinates of terminals of an input/output circuit 10. Here, for instance, the signal wirings 52 and 62 are respectively set onto a macrocell 20 so as to extend and be disposed in parallel to each other. The designer places or locates two buffering cells in positions lying on the wiring paths obtained by the corresponding setting and within a buffering cell layout area 80 so as to interpose the macrocell 20 therebetween (S04).

Described concretely, the designer places two buffering cells 54 and 55 in a wiring path comprising the signal wirings 51 through 53 within the buffering cell layout area 80 so as to interpose the macrocell 20 therebetween. Buffering cells 64 and 65, and 74 and 75 are also disposed in like manner. At this time, the designer places the buffering cells 54 and 64 adjacent to each other with a gap or interval therebetween being spaced twice or more the minimum wiring pitch away from each other. Likewise, the buffering cells 64 and 74 adjacent to each other are also disposed with being spaced twice or more the minimum wiring pitch away from each other. The minimum wiring pitch is defined by a semiconductor manufacturing process for manufacturing the semiconductor integrated circuit device 1.

Subsequently, the designer temporarily takes off or eliminates the standard cells temporarily disposed in the pre-process and relocates the standard cells in their corresponding normal positions (S05). The designer performs a transmission timing discussion under layout conditions subsequent to the relocation of the standard cells to finally decide the optimum positions of the standard cells and places or locates the standard cells again (S06).

Next, the designer wires all signal wirings containing the signal wirings 51 through 53, 61 through 63 and 71 through 73 (S07). According to the above process steps, the layout of the semiconductor integrated circuit device 1 shown in FIG. 10 is created.

The designer creates a parasitic capacitance/delay time table comprising parasitic capacitances and transmission delay times of transmission signals for every signal wiring, based on layout data (S08). The designer generates the table by means for automatically extracting the parasitic capacitances and the delay times, or the like, which is provided in a normal semiconductor integrated circuit designing device.

Subsequently, the designer performs, for example, a transmission simulation of a transmission signal based on the parasitic capacitance/delay time table by crosstalk noise verifying means provided in the normal semiconductor integrated circuit designing device thereby to execute crosstalk noise verification for every signal wiring (S09). After this verification, the designer confirms whether an error occurs for each signal wiring (S10).

Figure 10:
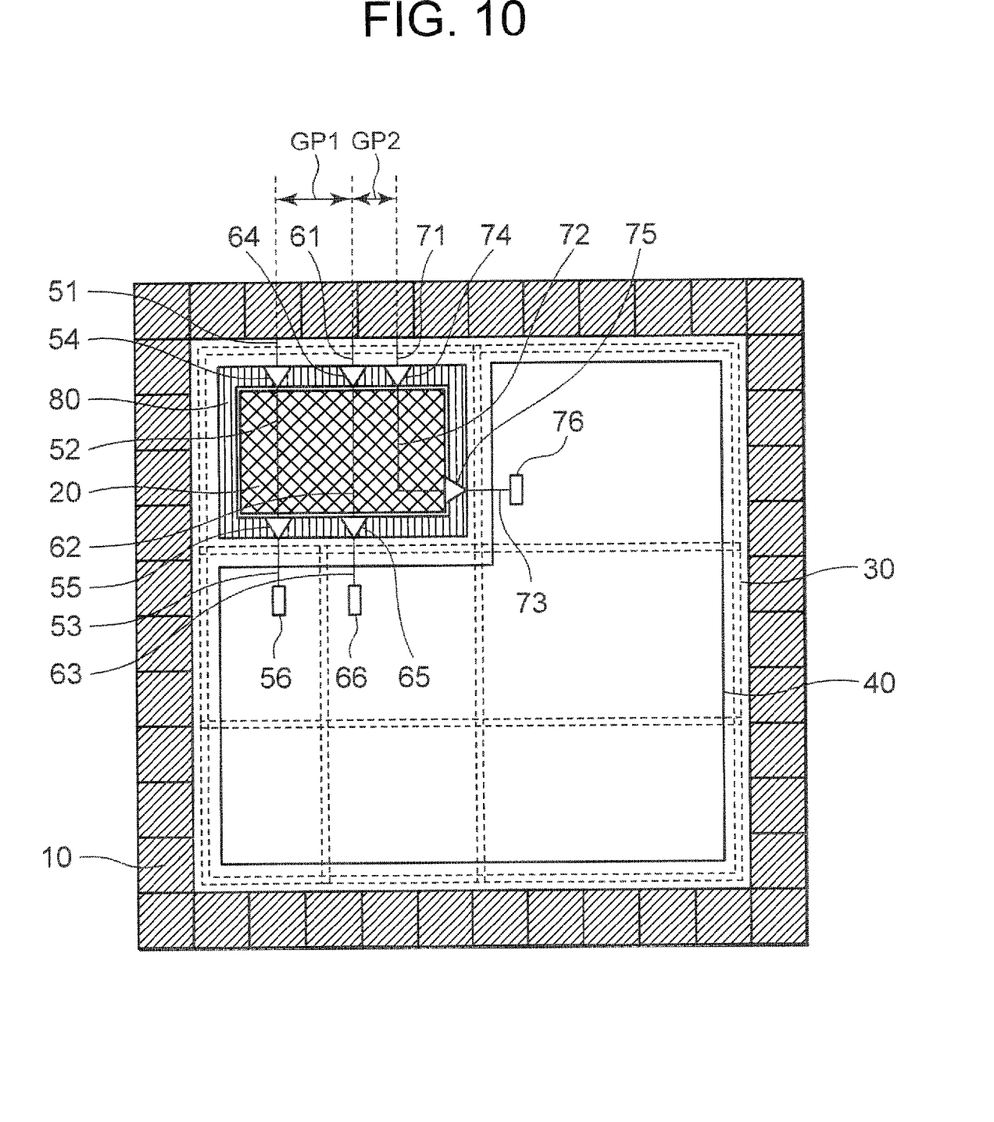
FIG. 10 is a plan view depicting the semiconductor integrated circuit device including buffer cells.

In the layout of the semiconductor integrated circuit device 1 shown in FIG. 10, waveform rounding of transmission signals transmitted through the signal wirings 52, 62 and 72 are respectively reduced by buffering based on the buffering cells 54, 64 and 74 placed around the macrocell 20. Therefore, no transmission delay occurs even when crosstalk noise is superimposed on each transmission signal. With the layout of the mutually-adjoining buffering cells 54, 64 and 74 and signal wirings 52, 62 and 72 at gaps or intervals each equal to twice or more the minimum wiring pitch defined by the semiconductor manufacturing process, the signal wirings 52, 62 and 72 are also disposed at intervals each equal to at least twice or more the minimum wiring pitch with respect to one another. Therefore, the coupling capacitance between the signal wirings 52, 62 and 72 is reduced. As a result, the amount of crosstalk noise superimposed on the transmission signal at each of the signal wirings 52, 62 and 72 is reduced. Therefore, the occurrence of transmission delays due to the crosstalk noise is avoided at the signal wirings such as the signal wirings 52, 62 and 72 extending so as to pass over the macrocell 20, and no errors occur upon crosstalk noise verification.

The signal wirings (not shown) lying within the standard cell layout area 40 in which errors have occurred upon the crosstalk noise verification, is wire-corrected by wiring automatic correcting means included in the normal semiconductor integrated circuit designing device (S11). After the wiring correction, the crosstalk noise verification is executed again (S09). If no problem occurs, then a layout as to whether other correction points exist (S12) is verified (S12). The final layout data is completed through the correction of a trouble spot by the corresponding verification (S13).

According to the layout design flow of the semiconductor integrated circuit device described above, in the process step prior to the wiring step, the macrocell is disposed close to the input/output circuit and the buffering cells for suppressing waveform rounding are disposed between the input/output circuit and the macrocell. Subsequently, the signal wirings are placed so as to pass over the macrocell via the buffering cells as viewed from the input/output circuit. At this time, the buffering cells and the signal wirings respectively adjacent to one another are placed with spacing therebetween being opened up. Since the occurrence of a transmission delay time due to crosstalk noise can be avoided with such a layout, it is not necessary to correct the signal wirings wired on the macrocell after the layout thereof. It is therefore possible to cut or reduce work and time spent on the wiring correction and design the layout of a normally operable semiconductor integrated circuit device without greatly changing the layout retroactively to a layout initial step.

Although the present embodiment has shown the example in which the semiconductor integrated circuit device 1 contains one macrocell 20, similar advantageous effects can be brought about by laying out buffering cells in like manner even where a plurality of macrocells are contained therein.

While the preferred form of the present invention has been described, it is to be understood that modifications will be apparent to those skilled in the art without departing from the spirit of the invention. The scope of the invention is to be determined solely by the following claims.

What is claimed is:

1. A semiconductor integrated circuit device including an input/output circuit, comprising:
    a macrocell formed close to the input/output circuit;
    a buffering cell formed between the input/output circuit and the macrocell and formed outside a region on which the input/output circuit is formed;
    an input-side signal wiring having one end connected to the input/output circuit and the other end connected to an input of the buffering cell; and
    an output-side signal wiring having one end connected to an output of the buffering cell and extended so as to pass over an area in which the macrocell is formed.

2. The semiconductor integrated circuit device according to claim 1, further including a receiving-side buffering cell connected to one end of the output-side signal wiring and formed close to the macrocell.

3. The semiconductor integrated circuit device according to claim 1, further including other buffering cells each spaced away from the buffering cell and formed between the input/output circuit and the macrocell, other input-side signal wirings respectively connected to inputs of the other buffering cells, and other output-side signal wirings having one ends connected to outputs of said other buffering cells and extended so as to pass over the area formed with the macrocell, wherein a distance between the buffering cell and each of said other buffering cells is spaced twice or more a minimum wiring pitch defined by a semiconductor manufacturing process.

4. The semiconductor integrated circuit device according to claim 3, wherein the output-side signal wiring and said other output-side signal wirings extend in parallel with each other over the area formed with the macrocell.

5. The semiconductor integrated circuit device according to claim 3, wherein the output-side signal wiring and said other output-side signal wirings are spaced twice or more the minimum wiring pitch away from one another.

6. The semiconductor integrated circuit device according to claim 3, wherein the macrocell is interposed by the buffering cell and said other buffering cells.

7. The semiconductor integrated circuit device according to claim 1, further including source potential and ground potential wirings which surround the macrocell and the buffering cells.

* * * * *